United States Patent Office 2,808,521
Patented Oct. 1, 1957

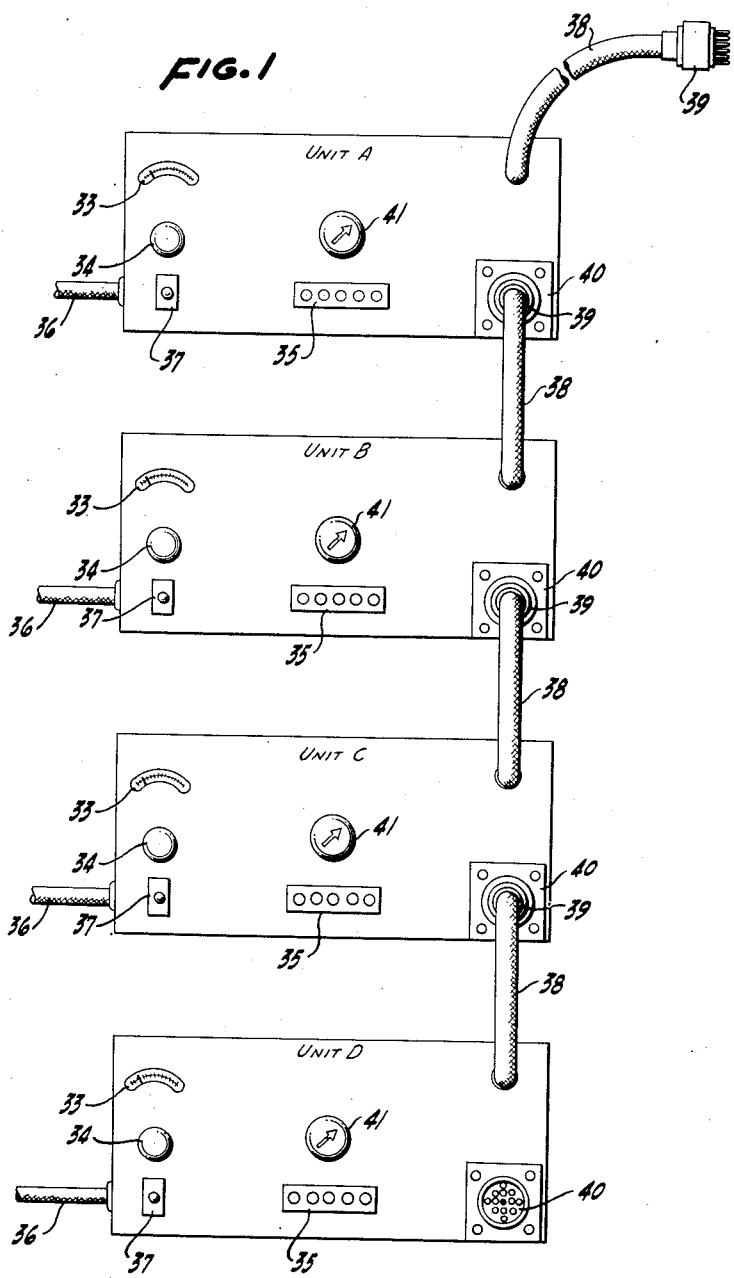

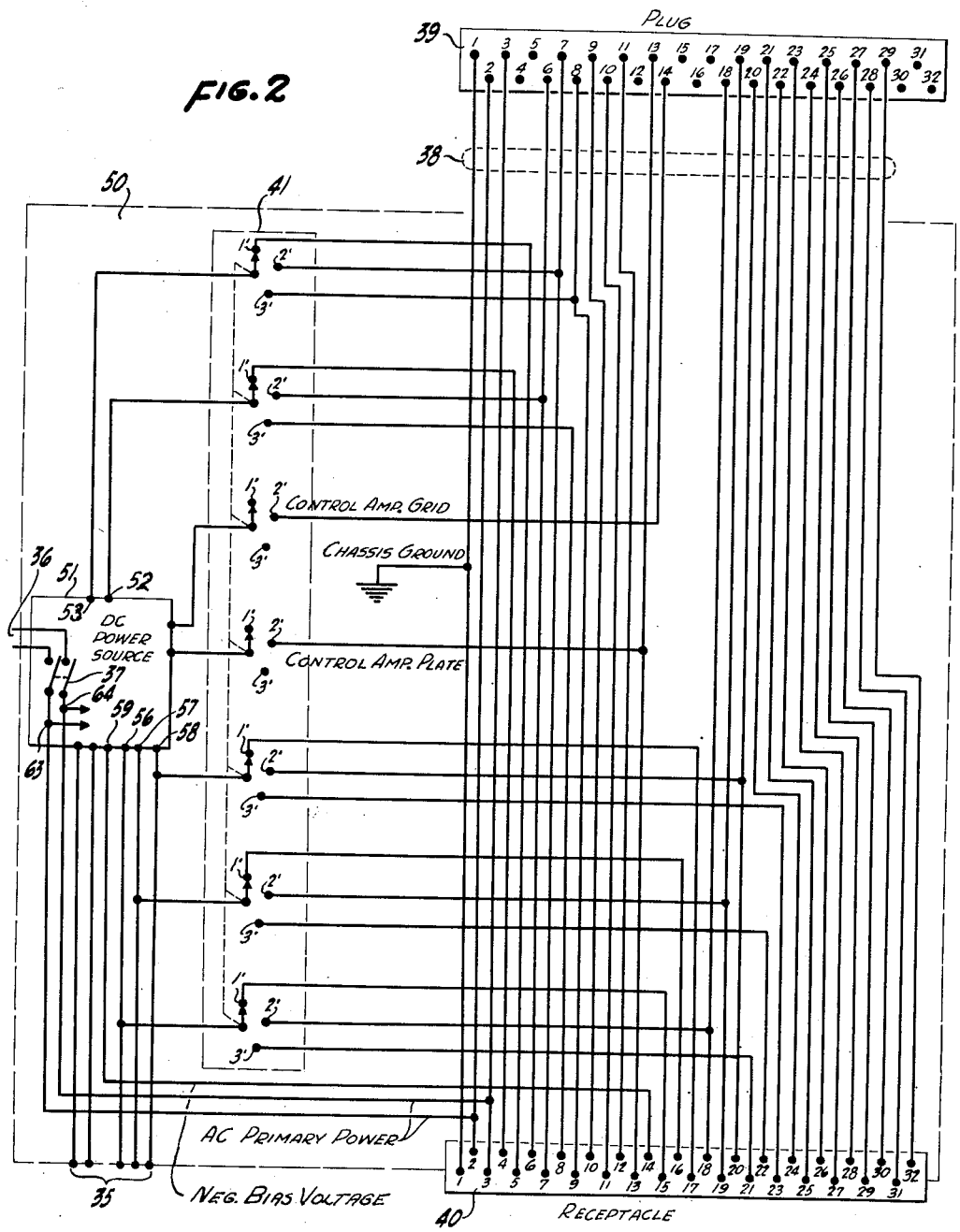

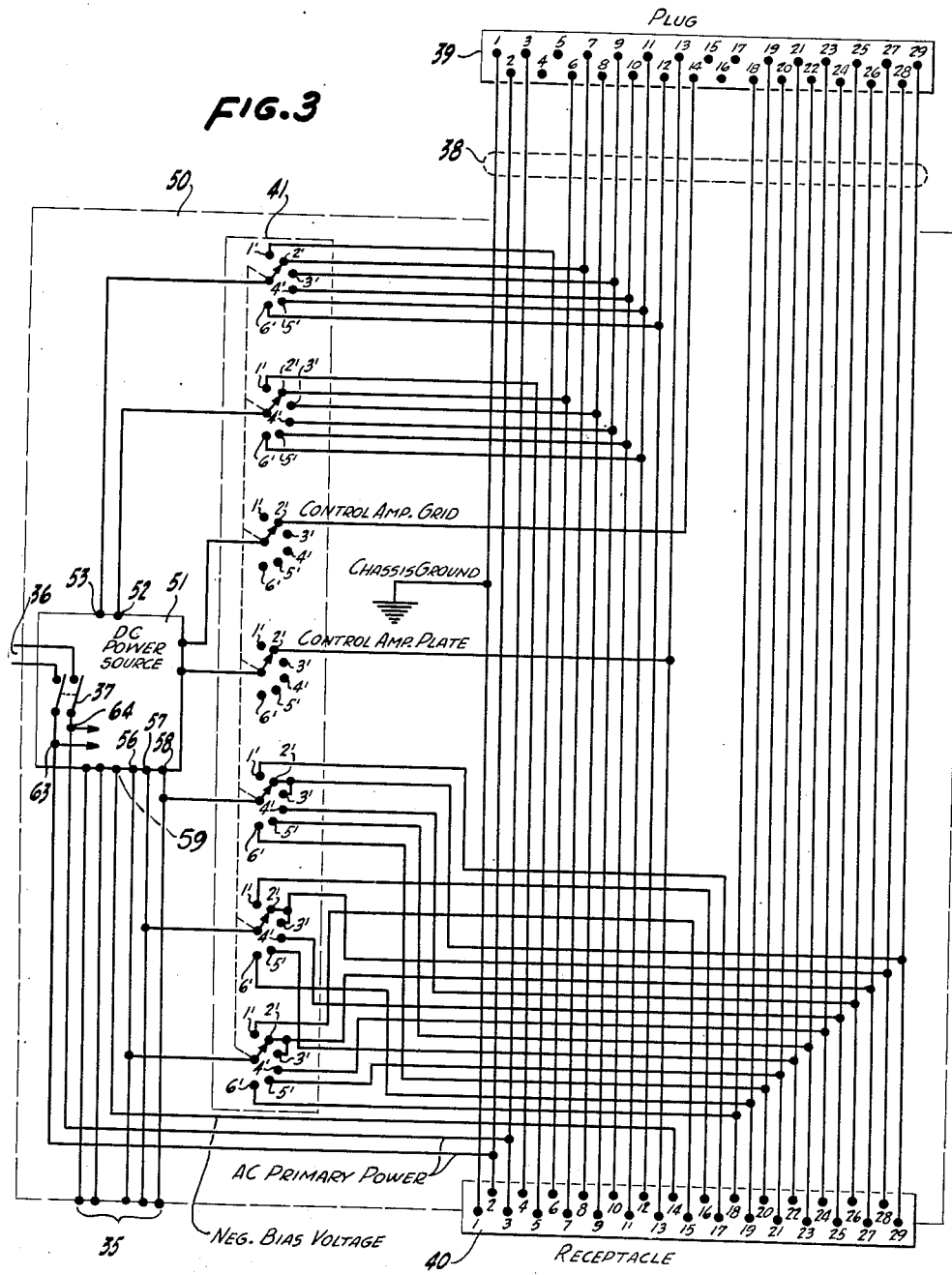

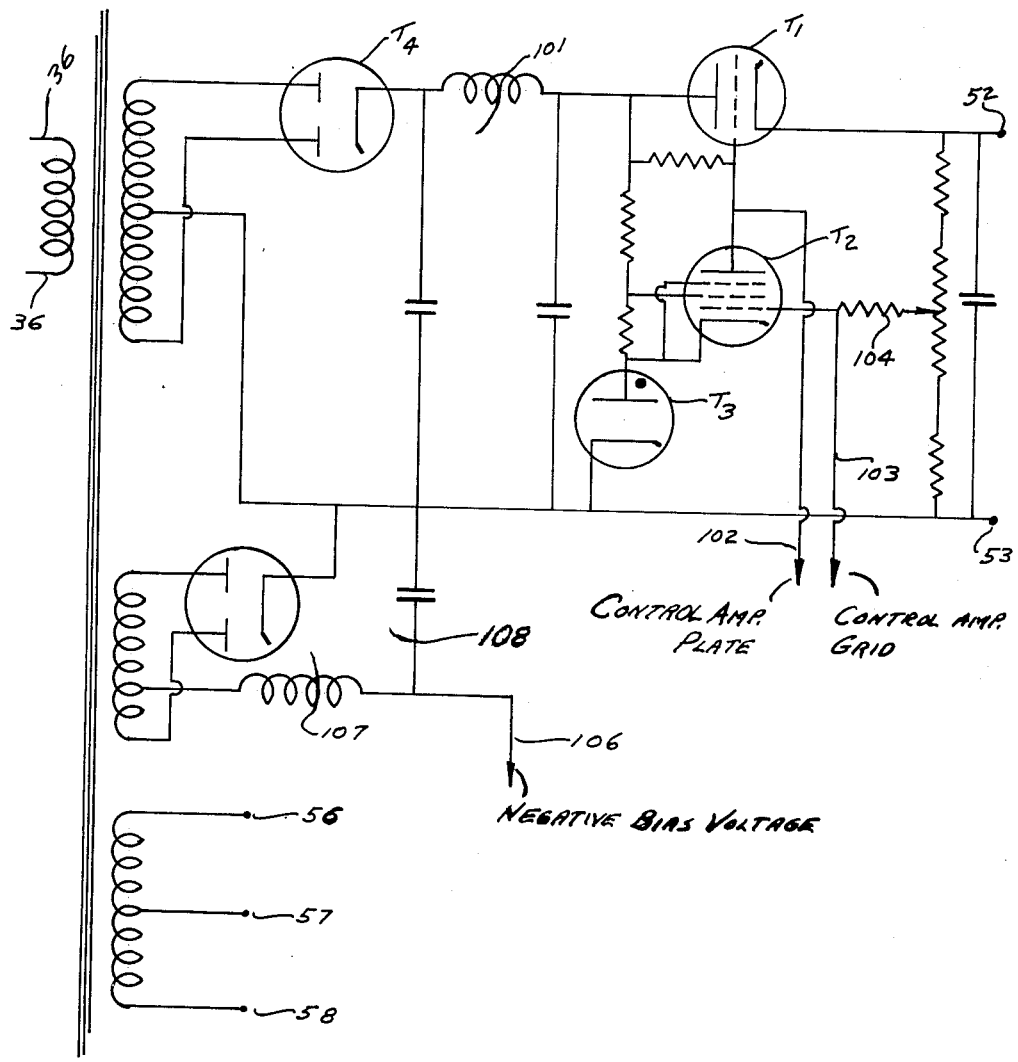

2,808,521

POWER SUPPLY SYSTEM

Robert K-F Seal, Washington, D. C., assignor of one-third to Eugene J. Hebert, Jr., Palo Alto, Calif.

Application June 23, 1954, Serial No. 438,801

12 Claims. (Cl. 307—150)

This invention relates generally to electrical power supply systems and methods such as are applicable to various electronic circuits or networks.

In electronic circuits it is necessary to supply direct current power to the plates of the various tubes employed. Generally the D.-C. power supply is included as an integral part of the circuit and comprises a suitable rectifier and filter. In circuits which require a constant plate supply, a regulator circuit is also included, which may include a voltage regulating amplifier tube.

Often in research laboratories there are many experimental circuits which do not have integral D.-C. power supplies. Furthermore, it is often necessary to supply various plate voltages or D.-C. power to these circuits.

Where batteries are employed it has been common to provide switching means connecting the batteries either in series, parallel, or a combination of the same, to provide the desired flexibility in voltage and current available. One disadvantage of such systems is that the batteries are bulky and heavy. Also, the life of the batteries is limited and the expense is prohibitive. In addition, the switching means employed is not convenient for the type of flexibility desired.

To replace batteries many electronic regulated direct current supplies have been designed. In general, they consist of transformers, rectifying means which might be either of the vacuum tube or barrier layer type, filters and often vacuum tube regulating means. These supplies may be designed to satisfy a specific range of power. In order to meet a different requirement, it is necessary to design a new power supply. To design and construct a power supply which has a broad range of power, i. e. voltage and current output, is relatively expensive. Further, such units are bulky and heavy.

In general, it is an object of this invention to provide a novel power supply system or method wherein a plurality of supply units may be conveniently connected in various combinations.

It is a further object of this invention to provide a direct current power supply system and method in which a plurality of direct current supply units have novel switching means, integral therewith, whereby they may be connected to operate as individual units, in series to provide higher voltage, in a parallel system to provide a higher current, or in series parallel combinations.

It is a further object of this invention to provide a power supply system and method in which a plurality of regulated direct current power supply units having switching means integral therewith to connect the units in various ways, the switching means providing for a single voltage control amplifier tube to operate when the units are connected in parallel, whereby instability due to multiple control is eliminated.

These and other objects of the invention will appear more clearly from the following detailed description in which the preferred embodiments of the invention have been set forth in detail in conjunction with the accompanying drawings.

Referring to the drawings:

Figure 1 shows a direct current supply system comprising four interconnected direct current power supply units.

Figure 2 shows a direct current power supply unit including a selector switch and interconnecting cable.

Figure 3 shows another embodiment of a direct current power supply unit, including a selector switch and interconnecting cable.

Figure 4 is a circuit diagram of a conventional direct current power source which may be used in the direct current supply system of my invention.

The system shown in Figure 1 consists of a plurality of separate direct current power supply units A, B, C, and D. The panel of each unit may include a voltage meter 33, and a knob 34 for adjustment of the output voltage level. A voltage output is available at the terminals of strip 35, and as will be presently explained this output may be the result of various combinations in which the units are connected. Terminals 36 indicate the primary A.-C. power input terminals. The A.-C. power input (from a common primary source) to each unit can be controlled by the on-off switch 37. However, as will be presently described, it is unnecessary to supply power directly (i. e. by separate direct connections) from the primary source to each of the individual units. By interconnecting the units in the manner hereinafter described, the power need only be connected from the primary source only to one of the units.

The power supply units are interconnected by means of cables 38, which are multi-conductor cables capable of withstanding the output voltage. Each cable extends from the cabinet of the associated unit and its free end is provided with a multiterminal plug 39, adapted to engage the receptacle 40 of an adjacent unit. Each receptacle has its terminals connected to the conductors of the cable for that particular unit. In other words the conductors at one end of a cable connect with a receptacle, and at the other end to a plug. It should be understood that either male or female or combination receptacles may be used. The plug must then mate with the receptacle.

As shown in Figure 1, the cable 38 for unit A has its output plug 39 free. This plug, by way of example, may be stored on the back panel of the direct current supply unit by means of a suitable clamp or supplementary receptacle. It may also be used to provide an auxiliary output in addition to output connected to terminal strips 35. The cable 38 for unit B is connected to the receptacle 40 of unit A. Similarly the units B, C and D are interconnected.

Identical selector switches 41 are provided for each unit and are interconnected with the conductors of the associated cables 38. By means of the selector switches 41, the units may be interconnected through the conductors of cables 38 to permit either individual, series, or parallel operation of the system, or various series-parallel combinations, as will be presently described.

In Figure 2, I have shown one embodiment of my invention in which the output of any one direct current power supply unit is available at that unit, the parallel output of all the units is available at any one of the units, and the total series output is available only at a terminal unit. Also, intermediate voltages may be obtained at the terminals of the individual direct current power supply units. Block 50 (dotted lines) represents a direct current power supply unit, and corresponds to any one of the units A, B, C, or D of Figure 1. The cable 38 with plug 39 and receptacle 40 is indicated schematically. The selector switch 41 is of the gang type and in this instance has seven sets of contacts and three operating positions. The direct current power source 51 may be of a type well known in the art. It may consist, for example, of a transformer, rectifying means, filtering means and, if desired, regulating means.

A suitable D. C. power source 51 is shown in Figure 4. The power source illustrated is described in Radio Engineering, third edition, 1947, pages 575, 577, by Terman. It comprises a full wave rectifier including a tube $T_4$ and filter circuit 101. The voltage regulator section comprises a voltage regulator tube $T_3$ which supplies a reference potential to maintain the cathode of the voltage regulator amplifier tube $T_2$ at a fixed potential irrespective of the D. C. output voltage. The voltage regulator amplifier tube $T_2$ is directly coupled to the control grid of the tube $T_1$ which serves to control the output voltage. The lead 102 connects to the control amplifier plate, and the lead 103 connects to the control amplifier grid. The resistor 104 having a relatively high resistance is inserted to permit the control amplifier grid to be biased to cut-off. A negative bias voltage is supplied to lead line 106 by the full wave rectifier 107 and filter 108.

The high voltage output of the direct current power source appears at 52 and 53. The power source should not be internally grounded to the chassis, although its positive or negative terminal may be grounded externally, when desired.

As an optional feature of the embodiment shown, I have included a center tapped filament supply system, which might be 6.3 or 12.6 volts A. C., and which preferably is separate from any filament system within the unit 51. The output of the center tapped filament supply shown appears at 56, 57 and 58.

At 59, I have shown a negative bias voltage. This voltage is utilized when the direct current power supply units are connected in parallel as will be presently described.

Primary power is supplied through the line cord 36, which may be detachable. When several units are interconnected, all the primaries (i. e. primaries of the supply transformers) are connected in parallel through cable conductors connecting the terminals 2 and 3 of the plugs 39 and receptacle 40. As a consequence, only one line cord is required, and the line switch 37 on the unit connected to the line controls the primary power to all the units. The power for each D. C. power source is removed at its terminals 63 and 64, which terminals are on the side of the on-off switch 37 farthest away from the A. C. power source. Terminals 63 and 64 are interconnected between the units at all times, regardless of the position of the switch 37.

As shown in Figure 2, the output of each individual power supply unit is directly available at 35. This is true regardless of the position of the selector switch 41.

The operation of the circuit for the various positions of switch 41 may briefly be described as follows:

With the switch 41 in position 41–1, no filament or high voltage connections are made to any other unit. Filament power is supplied to terminals 15, 16 and 17 and high voltage to terminals 4 and 5 of receptacle 40. As was noted previously, the filament supply system may have any voltage, or may be omitted entirely.

With switch 41 placed in position 41–2, the filament voltage is supplied to plug and receptacle terminals 18, 19 and 20, and the D. C. high voltage to terminals 6 and 7. The D. C. high voltage connections are made to plug and receptacle terminals 6 and 7. Therefore all interconnected direct current power supply units switched to position 2 will be connected in parallel. The parallel output of all the units is available at the terminals of each of the units.

In order to prevent instability, if regulated power supplies are used, the plates of the control amplifier tubes incorporated in each unit are connected to the plug and receptacle terminals 13. The control grid of each control tube, except the one in the unit terminating the group of units, is connected to terminals 14 whereby the associated tube is biased beyond cut-off by a negative voltage supplied to 14 from the adjacent unit. As is well known, any one of the grids of a multigrid tube may be biased to cut off the tube. In this manner, a single control tube which is not biased beyond cut-off will control the combined output voltages from all the units, thus preventing instability due to multiple control.

When all of the selector switches are placed in their third positions, the units are connected in series. In this connection the filament voltage of unit A appears at terminals 21, 22 and 23 (Figure 2) of the receptacle. The filament voltage of unit B appears at terminals 21, 22 and 23 of unit B, while the filament voltage of unit A appears at terminals 24, 25, and 26 of unit B. Similarly, unit C has its own filament voltage at its terminals 21, 22 and 23, the filament voltage of unit B at its terminals 24, 25 and 26 and the filament voltage of unit A at its terminals 27, 28, and 29.

Likewise for the third position of the switches 41, the high voltage of unit A appears at receptacle terminals 8 and 9. In unit B, the high voltage of unit A is transposed to the terminals 9 and 10, while the high voltage of unit B appears on terminals 8 and 9. In unit C, the high voltage of unit A appears at receptacle terminals 10 and 11, that of unit B at terminals 9 and 10, while the high voltage of unit C appears on the terminals 8 and 9.

The total series output is available only at the terminal unit, in this case, unit D. Intermediate voltages may be obtained at the terminals of the individual units, or at the receptacle of the terminal unit.

The only limitation on the number of units which may be interconnected is the number of terminals in the plugs and receptacles. A further limitation in the series connection is the breakdown voltage of the insulation and components. In the parallel construction the limitation is the current carrying capacity of the conductors.

In Figure 3, I have shown another embodiment of the invention. This includes a direct current power supply unit 50 having a direct current power source 51 as previously described. The D.-C. power source contains a high voltage output 52 and 53 and a center tapped filament supply 56, 57 and 58 as before. Provision for connection to an external A.-C. power supply is made through the cord 36 and the on-off switch 37 controls the unit. Here again, the primary A.-C. current power is connected in parallel to all the units, and is controlled by the unit which is connected to the alternating current power source. The interconnecting cable 38 with the plug 39 and receptacle 40 is provided as before. The selector switch 41 in this instance is a gang switch having six operating positions.

The operation of the circuit of Figure 3 for individual and parallel connections (positions 41–1 and 41–2 of the selector switch) are the same as described above for the circuit of Figure 2. However, in the series connection, the output of each unit is available at each of the interconnected units. This is accomplished by selecting the switch position of each unit according to its position in the series. Referring to Figure 1, this means that unit A would be set to position 3, unit B to position 4, unit C to position 5, and unit D to position 6. All the outputs may be made available on each unit by providing suitable terminals, or by providing two receptacles in paralle, with one of the receptacles being used to interconnect the units, and the other to take off the power.

A similar switching arrangement may be applied to the center tapped filament supply.

The advantage of the more complex arrangement of Figure 3 is that exactly the same voltages can be made to appear at the same terminals of the receptacles of each of the units of the multiple unit power supply system.

I claim:

1. A direct current supply system comprising a plurality of direct current power supply units, means for interconnecting the said units, said means comprising interconnecting multiconductor cables each terminating in a plug and a receptacle, and selector means incorporated in each of said units for connecting the said units for supplying their outputs individually, serially or in parallel to a load, said selector means each comprising a ganged selector switch having connections to the conductors of the associated cable.

2. A direct current supply system comprising a plurality of direct current power supply units, each of said units providing a direct current power output, a selector means integral with each of said units, and an interconnecting multiple conductor cable terminated in a plug and a receptacle and connected to said selector means, said units being interconnected by said cables whereby the selector means integral with each of said units may connect said units to supply their outputs individually, serially or in parallel.

3. A direct current power supply system as in claim 2 in which the network including the conductors of the cables serves to provide direct current output voltages at each of said units corresponding to the output voltage of the system.

4. A direct current supply system comprising a plurality of direct current power supply units, each of said units comprising a direct current power source having high voltage output terminals, a multi-conductor interconnecting cable terminated in a plug and receptacle adapted to be connected to other units, selector means integral with each of said units and connected to said high voltage output and to said interconnecting cable, said units being so connected by said cables whereby the selector for each of said units may connect said units to operate individually, serially and in parallel.

5. A direct current power supply system comprising a plurality of direct current power supply units, each of said units including a direct current power source having a high voltage output and a center tapped filament supply voltage output, a multi-conductor cable terminated in a plug and adapted to connect said unit to other units, selector means integral with each of said units and connected to said high voltage output and center tapped filament supply voltage output and selectively connecting said outputs to certain conductors of said cable, said units being interconnected whereby the selector means for each unit may connect said units to operate individually, serially and in parallel.

6. A direct current power supply system as in claim 5 in which the network including the conductors of the cables serves to provide direct current output voltages at each of said units corresponding to the output voltage of the system.

7. Apparatus as in claim 5 in which each of said power supply units is adapted to be connected to an alternating current power source and wherein the interconnecting cable connects the alternating source in parallel to all the units whereby a single switch on one unit controls all the units.

8. A direct current supply system comprising a plurality of separate current power supply units, each of said units comprising a direct current power source having high voltage output terminals and having a voltage regulator amplifier tube, said tube having at least plate, grid and cathode elements, said grid connected to a biasing lead, a multiconductor interconnecting cable associated with each of said units and terminating at its ends in a plug and a receptacle, each of said cables serving to connect one unit with an associated unit, selector means associated with each of said units and connected to the high voltage output of the same and also connected to the conductors of associated interconnecting cable, said units being so connected by said cables whereby the selector for each of said units may be conditioned to connect said units to operate in series or in parallel, certain of the conductors of said cables serving to form a conductive connection between the plates of all of said tubes, certain of the conductors of said cables serving to supply negative bias to the control grids of all of said tubes except the tube associated with the last one of the series of units to thereby bias the same beyond cutoff, when the selector means is conditioned for connecting all of said units in parallel, said tube associated with the last one of said units serving to regulate the D.-C. output voltage for the complete system.

9. A direct current power supply system as in claim 8 in which the network including the conductors of the cables serves to provide direct current output voltages at each of said units corresponding to the output voltage of the system.

10. In a direct current supply system comprising a plurality of direct current power supply units, each of said units comprising a direct current power source supplied with alternating current and having high voltage direct current output terminals, each unit also including a voltage regulating amplifier tube having plate, control grid and cathode elements, the tube of each unit normally serving to regulate the output voltage from the same, said system also including an electrical interconnecting network and switching means for the same whereby said units can be connected in series and in parallel for supplying different output voltages from the system, the method comprising establishing connection between all of the plates of said vacuum tubes when the units are connected in parallel, and also supplying the control grids of all of the units with the exception of the last one of said units with a bias voltage to bias such tubes beyond cut-off when the units are connected in parallel, whereby when the units are in parallel the voltage output of the system is controlled by the amplifier tube associated with the last one of said units.

11. A direct current power supply system comprising a plurality of regulated direct current power supply units, means for interconnecting the said units, said means comprising interconnecting multiconductor cables each terminating in a plug and receptacle, selector means associated with each of said units for connecting the said units for supplying their outputs individually, serially, or in parallel to a load, and means serving to permit only one of said units to regulate the output voltage when said units are connected in parallel.

12. A direct current supply system comprising a plurality of regulated direct current power supply units, each of said units including a voltage regulator amplifier tube, said tube having plate, at least one grid, and cathode elements, means for interconnecting said units, selector means incorporated in each of said units for supplying their outputs individually, serially or in parallel to a load, means providing a conductive connection between the plates of all of said tubes, means for supplying negative bias to one of said grids of each of the vacuum tube except the tube associated with the last one of the series of units, to thereby bias the tubes beyond cut-off when the selective means is conditioned for connecting the units in parallel, said tube associated with the last one of said units serving to regulate the D. C. voltage for the complete system.

References Cited in the file of this patent

UNITED STATES PATENTS

| | | |
|---|---|---|
| 530,432 | Kuchenmeister | Dec. 4, 1894 |
| 2,519,173 | Buder et al. | Aug. 15, 1950 |